United States Patent Office 3,522,326
Patented July 28, 1970

3,522,326
GRAFT COPOLYMERS OF POLYPHENYLENE ETHERS
Edgar E. Bostick, Scotia, and Allan S. Hay and Alan J. Chalk, Schenectady, N.Y., assignors to General Electric Company, a corporation of New York
No Drawing. Filed Oct. 5, 1967, Ser. No. 673,022
Int. Cl. C08b 43/02
U.S. Cl. 260—823                                10 Claims

ABSTRACT OF THE DISCLOSURE

Polyphenylene ethers can be metalated with alkali metals to introduce alkali metal atoms onto the backbone or onto the α-carbon atom of an alkyl side chain. These metalated polymers readily react with anionically polymerizable monomers to product graft copolymers comprising a polyphenylene ether backbone having grafted onto it, a polymer of the anionically polymerizable monomer. By controlling the amount of anionically polymerizable monomer, not only can the chain length of the graft polymer be controlled, but a different anionically polymerizable monomer may thereafter be added to produce a block copolymer graft. The graft polymers so produced by this process are useful for the making of molded, extruded or otherwise shaped articles, such as, films, fibers, etc., in the same way as the polyphenylene ethers. The effect of the polymeric side chains grafted onto the polyphenylene ethers modifies their properties, for example, their mechanical and electrical properties and permits the production of polymers with tailor made properties. Where the anionically polymerizable monomer has hydrolyzable groups, for example, acrylic esters, methacrylic esters, acrylic nitrile, etc., such groups may be hydrolyzed so that the resulting polymers have ion exchange, antistatic, surfactive or electrical conductivity properties.

---

This invention relates to graft copolymers of polyphenylene ethers and to the process of producing the same. More particularly this invention relates to graft copolymers comprising a polyphenylene ether backbone having grafted onto it, a polymer of at least one anionically polymerizable monomer. The particular polyphenylene ethers are those in which the preponderant repeating unit of the polymer molecule is a 1,4-phenylene ether unit.

Polyphenylene ethers, as a general class, are an extremely interesting group of new polymers. These polymers and processes of producing them are disclosed in U.S. Pats. 3,306,874, 3,306,875, 3,256,243, 3,257,357 and 3,257,358. As disclosed in the copending application of Allan S. Hay, Ser. No. 673,021, now U.S. Pat. 3,402,144, filed concurrently herewith and assigned to the same assignee as the present invention, there is disclosed and claimed, metalated polyphenylene ethers and a process of producing the same. These metalated polyphenylene ethers have repeating units having at least one of the formulas:

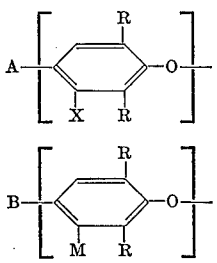

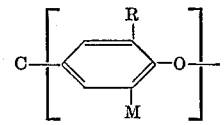

and

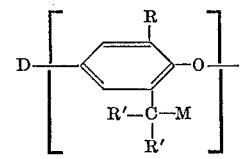

where X is selected from the group consisting of hydrogen and halogen, each R is independently selected from the group consisting of hydrogen, halogen, alkyl free of a tertiary α-carbon atom and aryl, R' is independently selected from the group consisting of hydrogen, alkyl and aryl, and M is an alkali metal with the proviso that M in Formulas B and C is lithium when R of the same formulas is alkyl, there being at least one of the metal containing units in the polymer molecule and at least 10 repeating units in the polymer molecule. Any remaining units of the polymer will be polyphenylene units, similar to the above, but joined through the ortho position when R in any of the above formulas which is substituted directly on the phenylene nucleus is hydrogen or halogen. Such units would be only a minor amount of the units present in the polymer. Preferably the polymer is made up of only the units represented by Formulas A, B, C, and D and any alkyl and aryl substituents have no more than 20 carbon atoms.

X in the above formula in addition to hydrogen may be an halogen, for example, chlorine, bromine or iodine. If X is halogen, it is preferably chlorine, since it is the cheapest and most readily available halogen. R in the above formula, in addition to being the same as X, may be alkyl free of a tertiary α-carbon atom, including aryl substituted alkyl, examples of which are methyl, ethyl, propyl, isopropyl, butyl, secondary butyl, hexyl, cyclohexyl, heptyl, octyl, decyl, octadecyl, etc., benzyl, phenylethyl, naphthylmethyl, phenylpropyl, tolylmethyl, xylylethyl, etc., aryl including alkyl substituted aryl, examples of which are phenyl, tolyl, xylyl, naphthyl, methylnaphthyl, ethylnaphthyl, ethylphenyl, biphenylyl, terphenylyl, etc. Additional examples of substituents which R may be, are those alkyl substituents free of a tertiary α-carbon atom and aryl substitutents disclosed as substituents on the starting phenols and polyphenylene ether products in the above-identified U.S. patents and copending application which are incorporated into this application by reference.

We have now found that the alkali metal atom of these polyphenylene ethers readily initiates polymerization of anionically polymerizable monomers, even at room temperature, or below, so that these polymers grow or graft onto the backbone of the polyphenylene ether at the positions where the alkali metal appear in the above formulas. In the graft polymerization process, the alkali metal is displaced from its position which it occupied on the polyphenylene ether and progressively moves along the terminal portion of the growing polymer. For example, in Formulas B and C, the anionically polymerizable monomer displaces the M from the phenyl group and in Formula D, the M from the α-carbon atom. The growing polymer attaches to the polyphenylene ethers at this point formerly occupied by M and grows from this point.

It is therefore easily seen that, if the initial metalated polyphenylene ether has a great number of M substituents, there will be a great number of sites from which the anionically polymerizable monomer may grow its graft polymer side chain. If one starts with two metalated polyphenylene ethers, one having a great number of alkali metal substituents and the other with only a few alkali metal substituents on the polymer molecule, but uses the same amount of anionically polymerizable monomer, the polyphenylene ether having the large number of alkali metal substituents will grow a large number of graft polymer side chains with the side chains being shorter than the polymeric side chains grown on the polyphenylene either having only a relatively small number of alkali metal substituents. However, on a weight basis, the percentage of polyphenylene ether and the polymer from the anionically polymerizable monomer will be the same in both cases. On the other hand, if the amount of anionically polymerizable monomer added with these two polyphenylene ethers, is based on adding the same amount of anionically polymerizable monomer for each alkali metal substituent, then the chain lengths of the grafted polymer will be the same, but the amount of graft polymer from the anionically polymerizable monomer will be much greater for the polyphenylene ether having the greater number of alkali metal substituents. By these means it is possible to tailor-make polymers having a wide variety of properties, and to do this even though the amount of polyphenylene ether and anionically polymerizable monomer may be the same.

As previously mentioned, the alkali metal atom continues to be present on the terminal end of the growing polymer chain. After all of the anionically polymerizable monomer has polymerized, this alkali metal is still present on the terminal end of the polymer. At this point, another anionically polymerizable monomer than the one previously used may be added to grow a block of an entirely different polymer and this may be repeated for as many times as desired. However, as is well known in the art, it is easier to graft onto the end of a previously grafted polymer if the previously grafted polymer is less polar monomer at the end with any intermediate being used in the order of increasing polarity.

For example, if one wishes to grow a block graft onto polyphenylene ether using styrene, methyl methacrylate and acrylonitrile, one would first use styrene then the methyl methacrylate and the acrylonitrile in that order. This would give a grafted block copolymer on the polyphenylene ether in which the polystyrene block was grown from the polyphenylene ether backbone followed by a block of polymethyl methacrylate attached to the polystyrene and the polyacrylonitrile block being the final terminal block.

After the graft copolymer has grown to the desired length, the alkali metal still remaining on the terminal group is usually removed by treatment with alcohol, water, an acyl halide, an alkyl halide, a triorganochlorosilane or other monofunctional reactant which reacts with the alkali metal and removes it from the polymeric grafted side chain, replacing it with the moiety from the terminating agent, i.e., hydrogen, in the case of water or an alcohol, alkyl halide and acyl group in the case of acyl halide, a triorganosilyl group, in the case of the triorganochlorosilane, etc.

Hay in his above-identified copending application disclosed that a shaped article of polyphenylene ether could be metalated without dissolving the polyphenylene ether in a heterogeneous reaction, so that the surface of the shaped article was metalated. When such a metalated shaped article of polyphenylene ether is used to grow the graft copolymer, the growing polymer chain can be terminated by the use of a difunctional agent, such as a diacyl halide, phosgene, a diorganodichlorosilane, etc., to cause cross-linking of the graft copolymer. By this means it is possible to form on the surface of a shaped article, for example, a film, a fiber or molded object of polyphenylene ether an insoluble, infusible cross-linked surface.

Any of the widely known anionically polymerizable monomers may be grafted onto the metalated polyphenylene ethers. Typical examples are $\alpha$-alkenes having from 2 to 8 carbon atoms, 1,3-dienes having up to 18 carbon atoms, monovinylarenes, vinyl chloride, vinylidene chloride, acrylonitriles, $\alpha$-substituted acrylonitriles, acrylic esters, $\alpha$-substituted acrylic esters, N,N-disubstituted acrylamides, including $\alpha$-substituted acrylamides, etc. These compounds can be represented by the formula

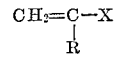

where R is hydrogen, $C_{1-8}$ alkyl or chlorine, X is chlorine, phenyl,

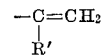

—CN or —COOR' where R' is hydrogen, $C_{1-8}$ alkyl or phenyl. Additional examples of anionically polymerizable monomers are: cyclic organosiloxanes, alkyl or aryl isocyanates having up to 8 carbon atoms in the alkyl or aryl group, 1,2-epoxy alkanes (1,2-alkylene oxides) having 2 to 8 carbon atoms, etc. Generally the cyclic organosiloxanes are trimeric or tetrameric diorganosiloxanes having the general formula

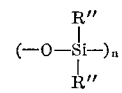

where $n$ is 3 or 4 and each R" is independently selected from the group of $C_{1-8}$ alkyl, phenyl, chlorophenyl, etc.

Specific examples of anionically polymerizable monomers which can be used are: styrene, $\alpha$-methylstyrene, o-, m-, and p-chlorostyrene, vinylnaphthalene, 1,2-dihydronaphthalene, acenaphthalene, acrylonitrile, $\alpha$-methacrylonitrile, $\alpha$-ethacrylonitrile, $\alpha$-octylacrylonitrile, N,N-dimethylacrylamide, N,N-dioctylacrylamide, N-methyl-N-ethylacrylamide, methyl acrylate, ethyl acrylate, butyl acrylate, cyclohexyl acrylate, 2-methylhexyl acrylate, octyl acrylate, methyl methacrylate, methyl ethacrylate, ethyl methacrylate, phenyl methacrylate, 2-vinylpyridine, 4-vinylpyridine, t-butyl vinyl ketone, N-vinylcarbazole, dicyanoethylene, vinyl chloride, vinylidene chloride, methyl sorbate, etc., butadiene, isoprene, 2,3-dimethylbutadiene, 1,3-pentadiene, 2-cyanobutadiene, 2-chlorobutadiene, 2-phenylbutadiene, etc., ethylene, propylene, 1-butene, 3-methyl-1-butene, 1-octene, ethylene oxide (1,2-epoxyethane), 1,2-epithiopropane, 2-phenyl-1,2-epoxyethane, 1,2-epoxypropane, 1,2-epoxybutane, 1,2-epoxyhexane, 4-phenyl-1,2-epoxybutane, 1,2-epithiobutane, 1,2-epoxyoctane, etc., ethyl isocyanate, propyl isocyanate, n-butyl isocyanate, isobutyl isocyanate, amyl isocyanate, hexyl isocyanate, undecyl isocyanate, octadecyl isocyanate, allyl isocyanate, 9-decenyl isocyanate, benzyl isocyanate, phenyl isocyanate, tolyl isocyanate, p-methoxyphenyl isocyanate, etc.,
hexamethylcyclotrisiloxane,
octamethylcyclotetrasiloxane,
hexaphenylcyclotrisiloxane,
octaphenylcyclotetrasiloxane,
cis- and trans-
2,4,6-trimethyl-2,4,6-triphenylcyclotrisiloxane
2,4,6-trimethyl-2,4,6-tris($\gamma$-trifluoropropyl)cyclotrisiloxane,
various isomers of trimethyltriethylcyclotrisiloxane,
various isomers of tetramethyltetraethylcyclotetrasiloxane,
various isomers of trimethyltrivinylcyclotrisiloxane,
trimethyltris($\beta$-cyanoethyl)-cyclotrisiloxane,
trimethyltris(4-chlorophenyl)cyclotrisiloxane,
2,4-dimethyl-2,4,6,6-tetraphenylcyclotrisiloxane, etc.

The acrylic compounds mentioned above are extremely reactive and can cause cross-linking in forming the graft copolymer. To avoid this, several techniques are available. One is to first add a compound such as 1,1-diphenylethylene which itself does not anionically polymerize, but will add a single unit to the metalated polyphenylene ether and thereafter when the acrylic compound is added, the tendency to cross-link is greatly reduced. Reducing the temperature and using the lithium metalated polyphenylene ether also aids in reducing cross-linking. Furthermore, as mentioned above, by first forming a graft polymer using a non-polar compound, such as styrene, α-methylstyrene, vinylnaphthalene, etc., and then adding the acrylic monomer will also tend to cut down the cross-linking.

Where the anionically polymerizable monomer is an α-alkene, it is preferred, since higher molecular weight graft polymers are prepared, that a tertiary diamine, for example, N,N,N′N′-tetramethylethylenediamine is used as a promoter or a reduced transition metal derivative is first formed with the metalated polyphenylene ether. For example, the metalated polymer is first reacted to form a complex of the alkali metal substituent on the polyphenylene ether with compounds, such as, aluminum alkyls, titanium halides, titanium esters, zirconium chloride, zirconium esters, vanadium chloride or vanadium oxychloride, etc. These same compounds can be used in conjunction with metalated polyphenylene ethers when making the other graft copolymers to produce stereospecificity in the graft polymer structure.

When 1,2-epoxy alkanes are grafted, it is preferred that the metalated polymer have potassium, rubidium or cesium as the alkali metal substituent. With the isocyanates, which form the so called 1-nylons as grafts on the polyphenylene ethers, the reaction should be carried out at very low temperatures, preferably −40° C., or below to prevent the isocyanates from reacting with themselves to form cyclic trimers. With the cyclotrisiloxanes, it is preferred that the alkali metal substituent on the metalated polyphenylene ether be lithium, whereas, in the case of the cyclotetrasiloxanes, the alkali metal substituents on the polyphenylene ether are preferably sodium or potassium.

Polyphenylene ethers in which both substituents in the 2- and 6-position are aryl when reacted with the metalating agent are metalated only in the 3- or 5(meta)-position. When one of the substituents is alkyl, metalation not only can occur in the 3- and 5-position, but also on the α-carbon atom. The polyphenylene ethers having two aryl substituents are more hindered and therefore, the reaction of such metalated polyphenylene ethers with the anionically polymerizable monomers occurs more slowly than with either unsubstituted polyphenylene ethers or polyphenylene ethers having at least one alkyl substituent. This reaction can be speeded by using a promoter, such as, hexamethylphosphortriamide or a tertiary diamine, for example, tetramethylethylenediamine. On the other hand, this reduced activity also permits grafting acrylic compounds without the tendency to cross-link as mentioned above.

The formation of the graft polymers on the polyphenylene ether backbone occurs quite rapidly, even far below room temperature. In fact, at room temperature, the reaction is generally exothermic. This means that the graft polymerization reaction can be carried out without the aid of heat or pressure, although such reaction aids can be used if desired. However, if the anionically polymerizable monomer is a gas, then pressure may be of advantage.

Since the metalating agents used to metalate the polyphenylene ether can themselves cause polymerization of anionically polymerizable monomers, the presence of any excess metalating agent in the reaction mixture from the metalating of the polymer, if not removed, can cause the formation of some homopolymer from the anionically polymerizable monomer. This is not necessarily undesirable since it permits the formation of compatible mixtures of the graft copolymer and the homopolymer, which are also useful for making molded, extruded and other shaped articles in the same way as the polyphenylene ethers and the graft copolymers of the invention. However, where it is desirable to produce only the graft copolymer, then either the metalating reaction should be carried far enough so that there is no residual metalating agent, or the metalated polymer can be precipitated and then redissolved in order to separate it from excess metalating agent prior to the graft polymerization reaction. Many of the solvents used in the metalation reaction, are themselves metalated so that the solution of the metalated polymer contains some metalated solvent as a by-product. Some of these metalated solvents, e.g., phenyl lithium from the metalation of benzene, can initiate polymerization of the anionically polymerizable monomer. Other solvents, e.g., tetrahydrofuran, although also very slowly metalated at or below ambient temperature, when used as a solvent, reacts further to open the ring and the alkali metal shifts to the oxygen atom to form an alkoxide. Such a compound does not generally initiate polymerization of vinyl type anionically polymerizable monomers. Therefore, such solvents are useful when no homopolymer is desired.

As mentioned previously, one anionically polymerizable monomer may be added and followed by one or more anionically polymerizable monomers to form block copolymers on polyphenylene ethers. Likewise, it is possible to use a mixture of anionically polymerizable monomers, so that the graft copolymer on the polyphenylene ether is a random type of copolymer graft on the polyphenylene ether. All of these variations and permutations will be readily discernable to one skilled in the art and within the full intended scope of this invention.

In order that those skilled in the art may better understand our invention, the following examples are given by way of illustration and not by way of limitation. In all of the examples, all parts and percentages are by weight unless stated otherwise.

Analysis of the polymers was carried out using PMR (proton magnetic resonance) spectroscopy, infrared spectroscopy, gel permeation chromatography (abbreviated to GPC hereinafter), osmotic pressure and dilute solution viscosity measurements. By these techniques, it was possible to detect homopolymer in those cases where it was formed in addition to the graft copolymer and to determine the ratio of the anionically polymerized polymer to the polyphenylene ether in the graft copolymer. Where ratios of moles of anionically polymerized monomer to polyphenylene ether are mentioned, it is on the basis of the molecular weight of the monomer to the molecular weight of the repeating unit of the polyphenylene ether, i.e., 120 in the case of poly(2,6-dimethyl-1,4-phenylene ether). Because of the high reactivity of the metalated polymer with moisture and oxygen and carbon dioxide present in air, all reactions were carried out in an inert atmosphere, generally oxygen-free nitrogen, and all reagents were anhydrous. Precautions were also taken to insure that the interior surfaces of the reactor were free of any moisture.

EXAMPLE 1

A solution of 3.66 g. of poly(2,6-dimethyl-1,4-phenylene ether) in 200 ml. of benzene was heated with stirring with 15 ml. of a 1 N solution of butyl lithium in hexane for one hour at 80° C., producing a bright red viscous solution. At this point, 30 g. of styrene was added and the solution allowed to cool to room temperature, at which point, ethanol was added to convert the terminal lithium atoms on the styrene grafts to hydrogens. The polymer was recovered by pouring the reaction mixture into excess methanol. After drying and extracting with hexane to remove any styrene homopolymer, there was obtained 28 g. of a graft copolymer in which polystyrene grafts had been grown onto the polyphenylene ether backbone. Similar results are obtained when poly(1,4-phenylene ether)

is used in place of the poly(2,6-dimethyl-1,4-phenylene ether is readily soluble in benzene.

EXAMPLE 2

A solution of 3.66 g. of poly(2,6-dimethyl-1,4-phenylene ether) in 250 ml. of benzene was metalated by reacting with 15 ml. of 1 N solution of butyl lithium in hexane by heating at reflux for one hour, by which time the solution was bright orange-red. To this solution was added 10 g. of acrylonitrile after the reaction mixture had been cooled to room temperature. The reaction was spontaneous as indicated by the increase in viscosity and some precipitation of the polymer. After treatment with ethanol and precipitation of the polymer in methanol, there was obtained 13 g. of a light yellow graft copolymer in which acrylonitrile had been grafted onto the polyphenylene ether. This polymer was found to form only a poor solution in benzene whereas the initial polyphenylene ether is readily soluble in benzene.

EXAMPLE 3

In this example, a poly(2,6-dimethyl-1,4-phenylene ether) was used which had a molecular weight of 50,000 by GPC and 20,000 by osmotic measurement using benzene as a solvent. A solution of 2 g. of the polyphenylene ether in 100 ml. of benzene was divided into two equal portions. One portion was treated with 1 ml. of a 15% solution of butyl lithium in hexane and 0.25 ml. of tetramethylethylenediamine, while the second solution was treated with 15 ml. of butyl lithium and 1.25 ml. of tetramethylethylenediamine. After 72 hours at room temperature, 10 ml. of styrene was added to each solution. The exothermic reaction occurred with the solutions becoming extremely viscous and red in color. After one hour at room temperature, the reaction was terminated by adding 1 and 2 ml. respectively of methanol to the solutions. The polymers were precipitated by pouring into methanol and dried.

GPC showed that there was no homopolymer present in the polymer recovered from the first solution and that the graft copolymer of the styrene on the polyphenylene ether had a molecular weight of 200,000. It was fractionated into two fractions which showed molecular weights of 150,000 and 300,000, respectively, by GPC and 126,000 and 311,000 by osmotic measurements. PMR spectroscopy showed that the initial ratio of styrene to polyphenylene ether was also present in the graft copolymer. The polymer recovered from the second solution when analyzed by GPC showed that there was some homopolymer present having a molecular weight of 1,800 and the graft copolymer had a molecular weight of 100,000.

EXAMPLE 4

Using the same polyphenylene ether as in Example 2, 3 solutions of 10 g. of polyphenylene ether in 500 ml. of benzene were metalated with butyl lithium in proportions so that the first solution contained 0.05 mole of lithium per phenylene ether unit, the second, 0.10 and the third, 0.20. After 22.5 hours, 10 g., 20 g., and 40 g., respectively, of styrene was added to the solutions. It will be noted that the amount of styrene was increased in the same proportion as the butyl lithium used to metalate the polymer. This should give increasing number of polystyrene grafts on each polyphenylene ether molecule, but each polymer graft should be of the same chain length.

There was a noticeable exotherm in each of the solutions after the addition of styrene. The graft polymerization reaction was allowed to continue over the weekend and thereafter terminated by adding sufficient methanol to each of the reaction mixtures to dissipate the red color. The polymers were precipitated by pouring into methanol from which they were recovered and dried. GPC showed that each of the polymers was free of any homopolymer and the molecular weights were 50,000, 80,000 and 105,000 respectively. Osmotic molecular weights were in close agreement showing 44,000, 62,000 and 86,000 respectively. PMR spectroscopy showed that the ratio of polystyrene grafts to the polyphenylene ether units were approximately the same ratio as the ratio of reactants used.

EXAMPLE 5

In this example, two portions of the same polymer as used in Example 3, were metalated to the same degree, but the amount of styrene used to graft onto the metalated polymer was twice as much in one case over that of the other. A solution of 1 g. of the polyphenylene ether in 50 ml. of benzene was metalated with 5.2 ml. of 15% solution of butyl lithium in hexane, in the presence of 1.2 ml. of tetramethylethylenediamine. After 16 hours at room temperature, 2.4 g. and 20.8 g. respectively of styrene were added to the two solutions. A red color developed immediately and an exotherm was noticed in both solutions. They were allowed to stand at room temperature overnight, at which point, the reaction was terminated by the addition of methanol to discharge the color and the polymer precipitated in methanol from which it was separated and dried. GPC showed that each of the polymers contained a small amount of homopolymer of polystyrene with a molecular weight of 1,400 and 2,400 respectively and the graft copolymers had molecular weights of 140,000 and 240,000 respectively, which confirms that by using a larger amount of styrene, longer chains of the grafted polystyrene are formed on the polyphenylene ether.

In the above examples where homopolymer was formed, it could be explained by the fact that some of the benzene had been metalated to phenyl lithium which initiated homopolymerization. The homopolymer, if sufficiently high in molecular weight (e.g., high ratio of styrene to lithium), will coprecipitate in methanol with the graft copolymer. When tetrahydrofuran was used in place of benzene as a solvent, no homopolymer was detected in the graft copolymers obtained. This is because even though, tetrahydrofuran is capable of being metalated in addition to the polyphenylene ether in the metalating reaction, the species formed has the alkali metal associated with the oxygen which generally is incapable of initiating polymerization of vinyl type anionically polymerizable monomers.

EXAMPLE 6

Three solutions, each containing 1 g. of poly(2,6-dimethyl-1,4-phenylene ether) in 50 ml. of tetrahydrofuran, were metalated using 0.5 ml., 1.0 ml., and 5.0 ml., respectively of a 15% solution of butyl lithium in hexane and allowed to stand for 1 hour at room temperature. Each solution was then cooled and a solution of 2 ml. of styrene in 10 ml. of tetrahydrofuran which also had been cooled to −40° C. was added to each. Each solution was shaken vigorously for several minutes and then allowed to warm to room temperature and allowed to stand for an additional 18 hours. The red color of the solution was discharged on the addition of 1 ml. of methanol to each of the solutions. After isolation of the polymer by precipitation in methanol, it was found that the polymers were free of any homopolymer of polystyrene and the graft copolymers had molecular weights of 51,000, 46,000 and 47,700, respectively by osmotic measurement. Evaporation of the methanol filtrate also showed no homopolymer. This is to be compared to the initial molecular weight of 18,500 of the polyphenylene ether determined by the same means. PMR spectra showed that each of the graft copolymers had a ratio of about 2.5 styrene units for each polyphenylene ether monomer units. Calculations based upon the actual ratios showed that the chain length of each of the styrene grafts on the polyphenylene ethers were 46, 18 and 8, respectively. By differential scanning calometric measurements at a heating rate of 40° C., per minute, the glass transition temperatures of the three graft polymers were found to be 122.1, 121.9 and 121.8° C., respectively. This is to be compared with a glass transition temperature of 126° C. for a physical mixture of the same composition made with the same polyphenylene ether and a polystyrene having a molecular weight of 100,000.

EXAMPLE 7

Two solutions were prepared, each containing 1 g. of poly(2,6-dimethyl-1,4-phenylene ether) in 60 ml. of tetrahydrofuran. To each solution was added 0.5 ml. of 1.622 N butyl lithium in hexane and allowed to stand at room temperature for 1 hour. A yellow color formed immediately which deepened with time. One of the two solutions was added, with stirring to a solution of 0.18 g. of hexamethylcyclotrisiloxane in 30 ml. of tetrahydrofuran. The yellow color which had developed during the metalation reaction was slowly discharged and there was a noticeable increase in viscosity of the two solutions, which became turbid after about 10 minutes with the polymer precipitating after about 15 minutes. After 18 hours at room temperature, the polymerization reactions were terminated by the addition of 1 ml. of trimethylchlorosilane to each of the solutions causing the precipitated polymer to dissolve and the solutions to become clear water-white. After precipitating the polymers in methanol, GPC showed the absence of any homopolymer of the polydimethylsiloxane and that each of the two graft copolymers had molecular weights of 100,000. The glass transition temperatures of the graft copolymers were 160–163° C. and 120–122° C., respectively, compared to a glass transition temperature of 240° C. for the initial polyphenylene ether. It was also found that these polymers were able to withstand heating at 175° C. in air for a longer time than the initial polymer before they became brittle.

It was also found that the graft having a glass transition of 160–163° C. gave a flow rate of 0.2 g./min. at 228° C. with a Tinius Olsen Model 3 Extrusion Plastometer. To attain the same flow rate, the original polyphenylene oxide require a temperature of 280° C. Thus the incorporation of polydimethylsiloxane side chains results in a lowering of the temperature at which the polymer can be extruded. This is useful where it is necessary to keep the extrusion temperature low. This lowering of the working extrusion temperature is directly related to the amount of silicone incorporated. It should further be noted that these grafts are optically clear when molded unlike a simple physical mixture which separates into two phases.

EXAMPLE 8

A solution of 5 g. of poly(2,6-dimethyl-1,4-phenylene ether) in 250 ml. of toluene was prepared and divided into five equal portions. Each of these was metalated at room temperature using a 15% solution of butyl lithium in hexane and tetramethylethylenediamine in the proportions shown in Table I.

TABLE I

| | ml. of TMEDA | ml. of butyl lithium solution |
|---|---|---|
| 1 | 0.06 | 0.25 |
| 2 | 0.12 | 0.50 |
| 3 | 0.24 | 1.0 |
| 4 | 0.6 | 2.5 |
| 5 | 1.2 | 5.0 |

After metalation had been allowed to proceed for 20 minutes, the solutions were cooled to −40° C., and 1 ml. of phenyl isocyanate in 10 ml. of toluene was added with vigorous shaking. The solutions were kept below −10° C. for one hour and the graft polymerization reaction terminated by the addition of approximately 2 ml. of methyl iodide. Addition of the phenyl isocyanate caused the color of the metalated polyphenylene ether to fade quickly and the solutions to increase in viscosity. The addition of the methyl iodide caused a solid suspension of the polymer to be formed in the liquid phase of the reaction medium. These graft copolymers had intrinsic viscosities of 0.52, 0.49, 0.53, 0.61 and 0.65 dec. ml./g. in chloroform at 25° C., respectively. These graft copolymers were soluble in chloroform, but only very sparingly soluble in benzene. The homopolymer of phenyl isocyanate is reported to be soluble only in sulfuric acid. The polyphenylene ether is readily soluble in benzene as well as chloroform. When films of these graft copolymers where exposed in a strained condition to saturated hydrocarbon liquids, it was found that they had improved resistance to stress-crazing over films of the unmodified polyphenylene ether.

EXAMPLE 9

A solution of 2 g. of poly(2,6-dimethyl-1,4-phenylene ether) in 100 ml. of tetrahydrofuran was divided into two equal portions. To each was added 1 ml. of 1.6 N butyl lithium solution in hexane and allowed to stand at room temperature for 45 minutes. The solutions were cooled −10° C. The first sample was added to 1.09 g. of isoprene and the second to 5.45 g. of isoprene, which also had been precooled to −10° C. A temperature rise of about 2° C. and 7° C., respectively were noted in the two solutions. The solutions were allowed to warm to room temperature and to stand for 5.5 hours at which point, the polymerization reaction was terminated by the addition of 1 ml. of trimethylchlorosilane. GPC showed the absence of any homopolymer of isoprene and that the graft copolymers had molecular weights of 100,000 and 140,000, respectively. These grafts copolymers had intrinsinc viscosities (chloroform at 25° C.) of 0.47 and 0.63 dl./g., respectively. The initial polymer had a molecular weight by GPC of approximately 70,000 and an intrinsic viscosity of 0.52 dl./g. (chloroform at 25° C.).

EXAMPLE 10

Two solutions were prepared, each containing 1 g. of poly(2,6-dimethyl-1,4-phenylene ether) in 50 ml. of tetrahydrofuran. To each was added 0.5 ml. of 1.6 N butyl lithium in hexane. After standing for one hour at room temperature, during which time a deep yellow color developed, 0.15 ml. of 1,1-diphenylethylene was added to each solution. After 18 hours, the solutions were then cooled to −90 to −95° C. One solution was added with vigorous shaking to a solution of 0.8 g. of methyl methacrylate in 25 ml. of tetrahydrofuran which also had been cooled to −90 to −95° C. The same amount of methyl methacrylate in the same amount of tetrahydrofuran was precooled and added with vigorous shaking to the second solution of the metalated polyphenylene ether. The deep red color of the solution was completely discharged 30 to 45 seconds after the methyl methacrylate was added. The reaction mixtures were extremely viscous but clear on warming to room temperature.

After standing at room temperature for 5 hours, the polymerization reaction was terminated by the addition of 1 ml. of methanol. After precipitation, GPC showed that the graft copolymers were free of homopolymer and the polymers had molecular weights of 90,000 and 100,000, respectively. Their intrinsic viscosities were 0.59 and 0.61, dl./g., respectively, measured in chloroform at 25° C. PMR spectroscopy showed that the ratio of polymethyl methacrylate and polyphenylene ether in the graft copolymer was essentially the same as that used to form the graft copolymer.

EXAMPLE 11

The potassium dianion of the dimer of α-methyl styrene was prepared by adding 4 ml. of α-methyl styrene dissolved in 10 ml. of tetrahydrofuran dropwise over two hours to a stirred solution of 1 g. of potassium and 1 g. of biphenyl in 20 ml. of tetrahydrofuran and allowing to stand for 24 hours.

A solution of 1 g. of poly(2,6-dimethyl-1,4-phenylene ether) in 15 ml. of benzene was metalated with 3 ml. of the above potassium metalating reagent. After 35 minutes at room temperature a deep red gel formed. The reaction was allowed to stand for an additional 85 minutes after which 2 ml. of styrene dissolved in 15 ml. of benzene was added at 10° C. with stirring. An exothermic reaction was noted. After 1 hour, the graft polymerization reaction was terminated by the addition of 3 ml. of trimethylchlorosilane. The mixture was diluted to 100 ml. with benzene and the solution centrifuged. The graft copolymer was isolated by precipitating in methanol. After filtration and drying at 50° C., in vacuum for 24 hours, there was obtained 1.9 g. of a graft copolymer of styrene on the polyphenylene ether. Solvent extraction with hexane in a Soxhlet extractor revealed the absence of any polystyrene homopolymer. Infrared analysis showed the graft copolymer to have a ratio of polystyrene to the polyphenylene ether of 2.41.

Similar results are obtained when sodium, rubidium and cesium are used in place of potassium in preparing the metalating agent and thereafter using the metalating agent to metalate the polyphenylene ether and to make graft copolymers therefrom.

EXAMPLE 12

A solution of 1 g. of the poly(2,6-dimethyl-1,4-phenylene ether) in 50 ml. of tetrahydrofuran was metalated with 0.25 ml. of a 1.6 N solution of butyl lithium in hexane. After 3 hours at 25° C., a solution of 1.78 g. of hexamethylcyclotrisiloxane dissolved in 10 ml. tetrahydrofuran was added. After 20 seconds at room temperature, the solution had set up to a gel due to the graft polymerization of the hexamethylcyclotrisiloxane onto the polyphenylene ether. The reaction was allowed to proceed for 18 hours after which 8 ml. of a 0.1 N solution of dimethyl sulfate in 63.5 ml. of tetrahydrofuran was added which caused the polymer to redissolve. After 3 hours at room temperature, the reaction mixture was centrifuged to remove the lithium salts. A film cast from the clear solution becomes cross-linked and no longer soluble upon exposure to moist air.

EXAMPLE 13

A solution of 1 g. of poly(2,6-dimethyl-1,4-phenylene ether) in 60 ml. of tetrahydrofuran was metalated with 0.5 ml. of a 1.6 N solution of butyl lithium in hexane at room temperature. After one hour, 0.54 g. of hexamethylcyclotrisiloxane was added in 30 ml. of tetrahydrofuran. After standing overnight, the graft polymerization reaction was terminated with 1 ml. of trimethylchlorosilane. The sample was then concentrated to 40 to 50 ml. on a rotary evaporator under vacuum at room temperature, before precipitating the graft copolymer into excess of methanol, filtering and drying overnight at 60° C. in vacuum. For 0.1 g. samples of the above graft polymer were intimately mixed by grinding with respectively 0.005 g. of pyridine, 0.005 g. of lauric acid and 0.005 g. of trichloroacetic acid. The fourth was used as a control. Each of these polymer samples were pressed at 200° C. at 200 lbs per sq. inch pressure for one minute. All the pieces, except the fourth were found to be cross-linked and insoluble in solvents, such as, benzene and chloroform.

EXAMPLE 14

A solution of 1 g. of poly(2-methyl-6-phenyl-1,4-phenylene ether) in 30 ml. of tetrahydrofuran was metalated with 0.4 ml. of the 1.6 N solution of butyl lithium in hexane. The solution was divided into two portions. After two hours, one ml. of styrene diluted with 10 ml. of tetrahydrofuran was added to one sample with stirring. The second sample was reacted with 0.15 ml. of 1,1-diphenylethylene dissolved in 10 ml. of tetrahydrofuran, causing the solution to turn a deep red. After two hours, the second sample was cooled to −60° C., and 1 ml. of methyl methacrylate in 4 ml. of toluene precooled to −60° C. was added, causing the deep red color to be discharged. The graft polymerization was terminated in the first solution by the addition of 1 ml. of trimethylchlorosilane and in the second solution with 1 ml. of methanol. Both solutions were then diluted to 100 ml. with benzene and centrifuged to remove the lithium salt. The graft copolymers were recovered from both solutions by precipitation in methanol from which they were filtered, washed and dried in vacuum at 50° C. There was obtained, 1.1 g. of the graft copolymer of styrene on the polyphenylene ether from the first solution and 1.25 g. of the graft copolymer of methyl methacrylate on the polyphenylene ether from the second solution.

EXAMPLE 15

A solution of 1 g. of poly(2,6-diphenyl-1,4-phenylene ether) in 50 ml. of tetrahydrofuran was metalated at room temperature with 2.5 ml. of 1.6 N solution of butyl lithium in hexane, for a period of 1.75 hours by which time the solution was purplish in color. At this point, 2 ml. of methyl methacrylate was added which caused immediate decolorization of the solution and a slight exotherm. After one hour at 25° C., the graft copolymer was precipitated by pouring the reaction mixture into methanol. GPC showed that the graft copolymer had a molecular weight of 300,000 and the PMR spectrum showed that there was a ratio of 3.3 methyl methacrylate units per polyphenylene ether unit in this graft copolymer. Extraction with acetone showed the absence of homopolymer. The initial polyphenylene ether had a molecular weight of 130,000 by GPC.

EXAMPLE 16

A solution of 1 g. of poly(2,6-diphenyl-1,4-phenylene ether) in 50 ml. of tetrahydrofuran was metalated with 2.5 ml. of a 1.6 N solution of butyl lithium in hexane. After 24 hours at room temperature, 10 drops of styrene were added. This was not sufficient to decolorize the solution even after a period of several hours, when 30 more drops of styrene were added followed by 40 drops in 15 more minutes. The solution was noticeably more viscous but highly colored. The solution was heated to reflux but this still did not cause the color to discharge. The amount of styrene added was increased so that the total amount of styrene added was 2 ml. After an additional 1 hour and 45 minutes at room temperature, the polymerization reaction was still purple, but the graft polymerization reaction was terminated by the addition of two ml. trimethylchlorosilane which only decolorized the solution slowly during several hours. The reaction mixture was diluted to approximately 400 ml. with benzene and the graft copolymer precipitated by pouring into methanol. After filtering off the graft copolymer, the methanol filtrate was evaporated to dryness and showed no evidence of polystyrene homopolymer. The graft copolymer had a molecular weight of ca. $10^6$ as determined by GPC. The PMR spectrum showed that there was a ratio of 7.4 styrene monomer units per polyphenylene ether unit in the graft copolymer and this agreed very well with 7.5 determined from the infrared spectrum.

EXAMPLE 17

A solution of 6 g. of poly(2,6-dimethyl-1,4-phenylene ether) in 300 ml. of benzene and 50 ml. of hexane was heated under nitrogen to remove 100 ml. of the solvent mixture, thereby insuring complete removal of water. After cooling, 26.5 ml. of a 1.6 N butyl lithium solution in hexane was added to metalate the polymer, using mild heating. After 24 hours, the cherry-red solution of the metalated polymer was cooled and treated with 4.06 g. of titanium tetrachloride which caused an immediate reaction to produce a bluish-violet heterogeneous slurry of the titanium chloride complex with the lithiated polyphenylene ether. The reaction vessel was equipped with a cold finger cooled with a solid carbon dioxide-methanol mixture. Ethylene, which was dried by passing through a drying train, was bubbled in the reaction mixture through a fritted glass bubbling tube. An immediate reaction occurred causing ethylene to reflux to the cold finger and the formation of solid polymer around the fritted glass filter through which the ethylene was being introduced. The addition of the ethylene was continued for 4 hours, at which time, the graft polymerization reaction was terminated by the addition of 25 ml. of methanol. The polymer was precipitated by pouring the reaction mixture into excess methanol. After isolation of the polymer, it was found to consist of two parts. One part, 4 g. was soluble in cold benzene and was identified as unreacted polyphenylene ether. The other part which was insoluble in cold benzene, amounting to 3 g. was found to be the graft copolymer of polyethylene on the polyphenylene ether backbone.

Apparently during the reaction, the growth of the polyethylene graft onto the polyphenylene ether polymer which occurred around the fritted glass filter consumed all of the ethylene being introduced leaving a large portion of the metalated polyphenylene ether in the solution which was never in contact with the ethylene. This is readily overcome by using a high frequency vibrating type of mixer and introducing the ethylene above the surface of the solution of the metalated polyphenylene ether. In this way, all of the metalated polyphenylene ether is brought into contact with ethylene.

EXAMPLE 18

A solution of 5 g. of poly(2,6-dimethyl-1,4-phenylene ether) in 150 ml. of benzene was metalated with 25 ml. of a 1.6 N butyl lithium solution in hexane, by reaction at 40–50° C. for 18 hours and for 24 hours at room temperature. To this metalated polyphenylene ether, ethylene oxide was bubbled through the solution while permitting the ethylene oxide to reflux to a cold finger cooled with a solid carbon dioxide-methanol mixture. After about 30 minutes, 5 ml. of hexamethylphosphortriamide was added to enhance the rate of graft polymerization. After 4 hours, ethylene oxide flow was stopped and the reaction mixture was allowed to stand for several hours, before precipitating the polymer by pouring into excess methanol. Initially, the polymer was precipitated in a swollen state which required several rinsings with methanol containing a trace of hydrochloric acid, in order to reduce the swelling. After filtration and drying, there was obtained 7 g. of the graft copolymer of polyethylene oxide on the polyphenylene ether backbone. This graft copolymer of polyethylene oxide polyethylene ether is much more hydrophilic than the initial polyphenylene ether.

When this example is repeated, but using a polyphenylene ether which is metalated with potassium or sodium rather than a lithium, the reaction with the ethylene oxide to form the graft copolymer is much more rapid.

The above examples illustrate the many variations possible in the making of the graft copolymers of polyphenylene ethers. Similar results are obtained, when the other metalated polyphenylene ethers disclosed above and in the copending application of Hay referred to above and incorporated by reference herein, are used in place of the particular polyphenylene ethers used above.

The graft copolymers of polyphenylene ethers produced by our process have a wide variety of uses, for example, in the making of molded objects, the preparation of films and fibers and the like. As previously discussed the grafting process permits modification of the mechanical properties of the backbone polymer used, so that a particular characteristic can be attained, i.e., a lower glass transition temperature, a lower flow point, improved melt viscosity, etc. They may be used for the same applications as the polyphenylene ethers from which the graft copolymers are prepared. For example, they can be used in molding powder formulations, either alone or mixed with other polymers and may contain various fillers, such as food flour, diatomaceous earth, carbon black, silica, etc., to make molded parts, such as spur, helical, worm or bevel gears, ratchets, bearings, cam impact parts, gaskets, valve seats for high pressure oil and gas systems or other chemical fluids requiring resistance to chemicals, etc. They can be used to prepare molded, calendered, or extruded articles, films, coatings, threads, filaments, tapes and the like. They can be applied to a broad spectrum of uses as articles in the form of sheets, rods, tapes, etc., and are useful in electrical applications, such as cable terminals, terminal blocks, backing for electrical circuits, as components of dynamoelectric machines which operate at high temperatures, etc. Films of these graft copolymers either oriented or not, are useful as metal or fiber liners, containers, covers, closures, electrical insulating tapes, as sound recording tapes, photographic films, pipes and wire tapes, etc. As a coating material, they can be applied as a solution or suspension to any convenient foundation where a surface possessing their excellent properties is desired. They can be used as encapsulation material, for electrical insulation, for example, as a wire enamel, potting compound, etc.

In the foregoing discussion and examples, various modifications have been disclosed. Obviously other modifications and variations of the present invention are possible in light of the above teachings. It is therefore, to be understood that changes may be made in the particular embodiments of the invention described which are within the full intended scope of the invention as defined by the appended claims.

What we claim as new and desire to secure by Letters Patent in the United States is:

1. A graft copolymer comprising a poly(1,4-phenylene ether) backbone having anionically grafted onto it a polymer of an anionically polymerizable monomer.

2. The graft copolymer of claim 1 wherein the polyphenylene ether is poly(1,4-phenylene ether).

3. The graft copolymer of claim 1 wherein the polyphenylene ether is a poly(2,6-dimethyl-1,4-phenylene ether).

4. The graft copolymer of claim 1 wherein the polyphenylene ether is poly(2-methyl-6-phenyl-1,4-phenylene ether).

5. The graft copolymer of claim 1 wherein the polyphenylene ether is poly(2,6-diphenyl-1,4-phenylene ether).

6. The graft copolymer of claim 1 wherein the polymer graft on the polyphenylene ether is a polymer of at least one α-alkene having from 2 to 8 carbon atoms.

7. The graft copolymer of claim 1 wherein the polymer graft on the polyphenylene ether is a polymer of at least one ethylenically unsaturated compound having the formula $$CH_2=C-X$$
$$\phantom{CH_2=C-}R$$

where R is hydrogen, $C_{1-8}$ alkyl or chlorine, X is chlorine, phenyl, $$-C=CH_2$$
$$\phantom{-C=}R'$$

—CN or —COOR' where R' is hydrogen, $C_{1-8}$ alkyl or phenyl.

8. The graft copolymer of claim 1 wherein the polymer graft on the polyphenylene ether is a polymer of a cyclic organosiloxane.

9. The graft copolymer of claim 1 wherein the polymer graft on the polyphenylene ether is a polymer of an alkyl or aryl isocyanate having up to 18 carbon atoms.

10. A graft copolymer of claim 1 wherein the polymer graft on the polyphenylene ether is a polymer of a 1,2-epoxyalkane having 2 to 8 carbon atoms.

References Cited

UNITED STATES PATENTS

| | | | |
|---|---|---|---|
| 3,234,193 | 2/1966 | Leavitt | 260—877 |
| 3,356,761 | 12/1967 | Fox | 260—874 |
| 3,384,682 | 5/1968 | Erchak et al. | 260—874 |
| 3,402,144 | 9/1968 | Hay | 260—47 |
| 3,396,146 | 8/1968 | Schmukler | 260—47 |

FOREIGN PATENTS 1,478,225  3/1967  France.

MURRAY TILLMAN, Primary Examiner

M. J. TULLY, Assistant Examiner

U.S. Cl. X.R.

260—37, 46.5, 47, 824, 857, 874, 887, 895, 896, 897, 898, 899, 901.